(12) United States Patent
Ramsingh

(10) Patent No.: US 9,219,397 B2
(45) Date of Patent: Dec. 22, 2015

(54) MOTOR AND SWITCHING APPARATUSES, SYSTEMS AND METHODS

(71) Applicant: Trane International Inc., Piscataway, NJ (US)

(72) Inventor: Mark Ramsingh, Macon, GA (US)

(73) Assignee: Trane International Inc., Piscataway, NJ (US)

( * ) Notice: Subject to any disclaimer, the term of this patent is extended or adjusted under 35 U.S.C. 154(b) by 84 days.

(21) Appl. No.: 14/244,703

(22) Filed: Apr. 3, 2014

(65) Prior Publication Data

US 2014/0300301 A1 Oct. 9, 2014

Related U.S. Application Data

(60) Provisional application No. 61/808,026, filed on Apr. 3, 2013, provisional application No. 61/808,023, filed on Apr. 3, 2013, provisional application No. 61/808,020, filed on Apr. 3, 2013, provisional application No. 61/808,036, filed on Apr. 3, 2013.

(51) Int. Cl.

| | |
|---|---|
| *H02P 1/04* | (2006.01) |
| *H02K 15/00* | (2006.01) |
| *H02K 11/00* | (2006.01) |
| *H02P 6/00* | (2006.01) |
| *G05B 19/00* | (2006.01) |
| *H02P 5/00* | (2006.01) |
| *H02K 5/22* | (2006.01) |

(52) U.S. Cl.
CPC ............... *H02K 15/00* (2013.01); *G05B 19/00* (2013.01); *H02K 5/225* (2013.01); *H02K 11/0068* (2013.01); *H02K 11/0073* (2013.01); *H02P 5/00* (2013.01); *H02P 6/001* (2013.01); *H02K 11/0078* (2013.01); *H02K 2213/09* (2013.01); *H02K 2213/12* (2013.01)

(58) Field of Classification Search
CPC .............................. H02P 6/001; H02P 23/0081
USPC .............................................. 318/400.09, 438
See application file for complete search history.

(56) References Cited

U.S. PATENT DOCUMENTS

| | | |
|---|---|---|
| 5,994,869 A | 11/1999 | Becerra |
| 6,895,176 B2 | 5/2005 | Archer et al. |
| 7,049,786 B1 | 5/2006 | Toliyat et al. |
| 7,888,922 B2 | 2/2011 | Melanson |
| 8,264,182 B2 | 9/2012 | Ramu |
| 8,550,388 B2 | 10/2013 | Donaldson et al. |
| 8,619,442 B2 | 12/2013 | Wrathall |
| 8,829,865 B2 | 9/2014 | Domb |
| 2011/0068723 A1 | 3/2011 | Maiocchi |
| 2013/0026962 A1 | 1/2013 | Becerra et al. |

*Primary Examiner* — Erick Glass
(74) *Attorney, Agent, or Firm* — Taft, Stettinius & Hollister LLP

(57) ABSTRACT

Unique motor drive apparatuses, systems and methods are disclosed. One exemplary embodiment is an apparatus comprising an AC-DC power supply structured to couple with and drive an electric motor. A sampling and switching device is coupled with the power supply. The switching device is configured to sample an electrical condition of a plurality of power line inputs and to selectably connect the power supply with the plurality of power line inputs. A controller is operatively coupled with and structured to control the switching device in a first mode in which the controller determines a power at which to operate the motor based upon which of the plurality of power line inputs receives power and a second mode in which the controller provides power factor correction of the motor and selects the power line inputs connected to the AC-DC power supply by the sampling and switching device.

24 Claims, 1 Drawing Sheet

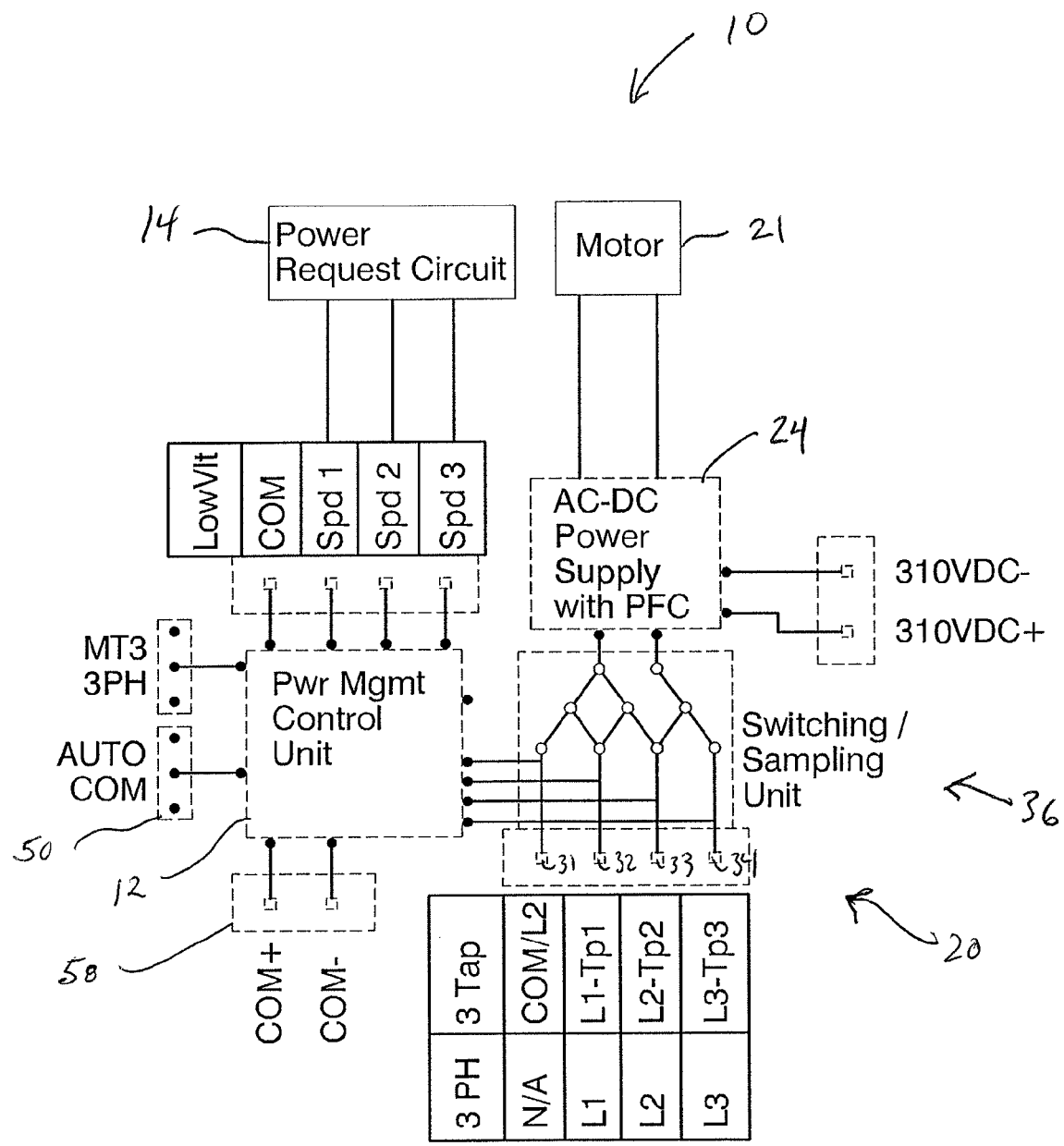

MOTOR AND SWITCHING APPARATUSES, SYSTEMS AND METHODS

CROSS-REFERENCE TO RELATED APPLICATIONS

This application claims the benefit of U.S. Provisional Application No. 61/808,026 filed Apr. 3, 2013, U.S. Provisional Application No. 61/808,023 filed Apr. 3, 2013, U.S. Provisional Application No. 61/808,020 filed Apr. 3, 2013, and U.S. Provisional Application No. 61/808,036 filed Apr. 3, 2013, each of which is incorporated herein by reference.

BACKGROUND

There exists an increasing need for efficiency in electric motor systems. Motors such as variable speed brushless DC (BLDC) motors and electronically commutated (EC) motors, and the structure and manner for sampling and switching such motors, remains an area of interest offering potential for efficiency enhancements. Existing proposals for systems including these and other types of motors suffer from various shortcomings, drawbacks, and disadvantages relative to certain applications. There remains a need for further contributions in this area of technology.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One exemplary embodiment is an apparatus comprising an AC-DC power supply structured to couple with and drive an electric motor. A sampling and switching device is coupled with the power supply. The switching device is configured to sample an electrical condition of a plurality of power line inputs and to selectably connect the power supply with the plurality of power line inputs. A controller is operatively coupled with and structured to control the switching device in a first mode in which the controller determines a power at which to operate the motor based upon which of the plurality of power line inputs receives power and a second mode in which the controller provides power factor correction of the motor and selects the power line inputs connected to the AC-DC power supply by the sampling and switching device. Further embodiments, forms, features, aspects, benefits, and advantages of the present application shall become apparent from the description and figures provided herewith.

BRIEF DESCRIPTION OF THE FIGURES

Features of the application will be better understood from the following detailed description when considered in reference to the accompanying drawings, in which:

FIG. 1 is a schematic diagram showing a motor apparatus according to an embodiment.

DETAILED DESCRIPTION OF ILLUSTRATIVE EMBODIMENTS

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

With reference to FIG. 1, there is illustrated a construction of a motor system 10 according to an exemplary embodiment. The motor system 10 includes power management control unit 12, a power request circuit 14, a driver section, a power supply section 20, and an external interface module. As will be described in greater detail below, in one embodiment, the motor system 10 can enable a single motor design to be used to allow a single phase brushless DC (BLDC) multi-tap configuration to be used with a single phase or poly phase line power supply, and in an additional and/or alternative embodiment, to be used for example with a multi-tap retrofit (or replacement) application.

The motor 21 can comprise any suitable rotating machinery and brushless DC drive circuit. The DC drive circuit receives a DC buss voltage of, for example, 310VDC, as illustrated, and controllably applies the voltage, or suitable derivatives thereof, to a winding to drive motor 21. The voltage can be applied to motor winding according to any suitable time and rotor position synchronized method to achieve a necessary or desired rotational characteristic, as will be appreciated.

The power supply section 20 includes an AC to DC power supply 24, a voltage output to the external interface module, and a sampling and switching unit 36 which may be an intelligent sampling/switching matrix or multiplexer. The as-shown AC to DC power supply 24 includes a power correction factor (PFC). As is further described below, the power supply section 20 can be configured with a communication link to an optional controller of a remote control device.

In the illustrative embodiment, there are four power inputs 31, 32, 33, 34 into the power supply section 20. In one form, a configuration switch can be provided to allow selection of different modes of operation.

In an embodiment, for example in the case of a multi-tap retrofit application, a single common (return) power wire can be provided, and up to three wires can be provided that can be actuated to indicate which speed is being requested. In one form, the power wires can be used to power a PSC multi-tap motor, as will be appreciated. In another form, such as in the case of the retrofit application, the high voltage wiring can remain (for example via user-selection) unchanged.

The power supply section 20 can be configured to continuously sample the power inputs 31, 32, 33, 34 and provide one or a combination of functions in the multi-tap mode of operation. In one embodiment, for example, the power supply section 20 can derive power from the wire with the highest voltage. In one non-limiting form, the inputs to the sampling and switching unit 36 can have a loading characteristic that will "pull down" outputs from semi-conductor switched power requests to prevent reading of "floating voltages."

Additionally and/or alternatively, the sampling and switching unit 36 can be configured to continuously monitor the state of the input power wires and choose the lowest numbered terminal position to derive its operating power, if for example, multiple wires are active with voltage. The differentiation of voltage amplitude between leads need not necessarily have high discrimination, particularly for example when voltages in the multi-tap operating mode are roughly the same across different taps (if and when they are actuated.)

As a further or alternative function in the multi-tap mode of operation, the power supply section 20 can be configured to derive and communicate requested power intent from input power wires. In one retrofit application, different wires can be actuated, and tied to different winding sections on a PSC type motor. For a change out, the power supply section 20 can determine which wires are active and indicate to another section of the motor which of the incoming power leads are active. Another section of the motor, for example the external interface module 22, can configure the response of the motor to each relayed power request, and resolve multiple power requests.

The motor system 10 can also be configured for three phase mode of operation. In the illustrative embodiment, the three power wires are connected to the inputs, and the motor system 10 can operate in either an "auto" mode or "comm" mode based upon information provided at auto/comm input 50. The mode of operation of the motor system 10 can be determined in any suitable manner, as by user-selection for example. In the "auto" mode of operation, the motor system 10 can do a time/power modulation to ensure that, for example, over a period of time, there will be an equal amount of power drawn from each line pair. In the "comm" mode of operation, the motor system 10 can respond according to a communication signal provided at comm. input 58 or the like to specify from which lines the motor is to derive power, and report the status back to a controller such as a remote control system. In one form, the motor system 10 can be configured such that, for example in the case where communication is lost, the motor can revert to "auto" mode. In one form, the sampling and switching unit 36 of the motor system 10 can incorporate a randomize function to ensure that a plurality of identical or otherwise similarly-characterized motors (for example motors located in the same building) do not follow the same switching schedule.

The motor system 10 can be configured according to any suitable application and/or operating environment. In the FIG. 1 embodiment, the power supply section 20 houses the sampling and switching unit 36 that routes the four power inputs to the pair of power inputs to the AC to DC power supply 24 (with optional power factor correction). The sampling and switching unit 36 can comprise any suitable switching matrix, for example, comprising staged electromechanical and/or solid-state switches that can route any pair of inputs on the external power inputs, to the pair of internal inputs to the AC to DC power supply 24. Further, the sampling and switching unit 36 can include an intelligent sampling section that manages the operation of the switching matrix, and can awake when there is power present between any two leads. In one form, the intelligent sampling section can incorporate non-volatile memory to ensure that balanced operation is attained, for example, in cases where power to the system is removed after every run.

The AC to DC power supply 24 can comprise an optional active power factor correction circuit (PFC circuit) that can enable the motor power factor to be close to unity.

The external interface module can interface with both external controls and with the power supply section 20 indicator signals (power output intent). The external interface module can also be configured to allow scaling and configuration of the motors response to each of the communicated power requests from the power request circuit 14, as well as other utility settings, as will be appreciated. In one embodiment, an input can be configured to zero power output, to allow a power tap to be used (in the multi-tap setting) to keep the motor powered-on all the time, to enable powered cycle-downs (for example, for acoustic benefits).

The single motor design assembly and its various functions need not be limited as described with respect to the FIG. 1 embodiment, and other embodiments and applications are contemplated.

The motor assembly 10 can be used to replace motors designed to replace PSC multi-tap or single tap applications. In one form, for example, the motor assembly 10 can auto-select the right pair of inputs to use that give the most potential difference of four inputs, derive power and speed intent from the wire pair, and signal another part of the motor to invoke a desired speed or torque amount for a particular application, or that a user can pre-set for a particular application. The motor assembly 10 can include an intelligent switching section, such as that described above with respect to the FIG. 1 embodiment, that can continuously monitor the incoming power wires to determine from which pair of wires to derive power. A managing circuit can be powered off parasitic draw from any of the incoming power wires. The managing circuit can communicate to another part of the motor which one(s) of the incoming power wires have the most potential difference to a common wire.

The motor assembly 10 can additionally or alternatively be used to replace combinations of three phase induction motors and three phase inverter drive units that run the motor with simultaneous balance across all three phases, and with lowered current draw (due to three-way distribution). The motor assembly 10 can include, for example, a single phase motor paired with an intelligent switching section, such as that described above with respect to the FIG. 1 embodiment, that can be operated in a different mode for the purposes of three-phase compatibility. The motor assembly 10 can be configured to modulate the amount of time/power duration that the single phase motors will be wired across each of the three phases to ensure that over a period of time (for example, a relatively moderately short period of time), the same energy will be used across all three phases. The motor assembly 10 can include an algorithm to track and memorize both time and power levels to ensure that an equal amount of power is drawn across all three phases. This mode of operation can be governed by a randomize function to ensure that motors do not follow for example the same usage pattern across for example a single installation site.

The motor assembly 10 can additionally or alternatively be used to replace a three phase motor with a single phase motor (for example, an instantaneously single phase motor) to realize an increase in current draw on two of the three conductors at any given point of time. Assuming for example that other factors are equal (or negligible), the motor assembly 10 can realize an increase of approximately 66% (based on three phase calculation). For motors and drives in which the power factor causes the VA of the motor or system to be much higher than the input Watts of the system or motor, or where the power factor is left unmitigated, and the power factor is between 55% and 75%, the motor assembly 10 can utilize a power factor correction circuitry, for example as described with respect to the FIG. 1 embodiment, to effectively cancel the effect of moving a three phase motor/drive combination to a single phase motor/drive combination.

In a further embodiment, the motor assembly 10 can be incorporated into a facility to remotely dictate which phases will be used to derive power. For example, a building entrance can be equipped with one or more phase/power imbalance detectors to detect power imbalances that the building experiences. The motor assembly 10 can be used in the facility to use significant contribution of HVAC systems to the overall building electrical characteristics. The motor assembly 10 can be operated in a manner to controllably reduce the overall energy usage profile of the building. In one embodiment, the motor assembly 10 can be used to treat phase imbalance issues associated with the building even when the building's HVAC systems are balanced.

In one embodiment, the motor assembly 10 can incorporate a means to configure the response of the motor to one or more power requests. In an embodiment the motor assembly 10 can incorporate a means to configure the response of the motor to pre-set points.

As will be appreciated, the motor assembly 10 can be used in connection with variable-speed/BLDC/EC products or other energy conscious usages, depending on the particular industry application, various manufacturer requirements and design considerations, among other things.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. An apparatus comprising:
   an AC-DC power supply structured to couple with and drive an electric motor;
   a sampling and switching device coupled with the power supply, the switching device configured to sample an electrical condition of a plurality of power line inputs and to selectably connect the power supply with the plurality of power line inputs;
   a controller operatively coupled with and structured to control the switching device in a first mode in which the controller determines a power at which to operate the motor based upon which of the plurality of power line inputs receives power and a second mode in which the controller provides power factor correction of the motor and selects the power line inputs connected to the AC-DC power supply by the sampling and switching device.

2. The apparatus of claim 1 wherein the controller modulates the time-power duration that the power supply will be electrically coupled with each of the plurality of power line inputs to balance the energy used across the plurality of power line inputs over a period of time.

3. The apparatus of claim 1 wherein the second mode is configured to provide an equal amount of power drawn from each of the plurality of power line inputs over a period of time.

4. The apparatus of claim 1 wherein the second mode is configured to respond to a communication signal provided at an input to the apparatus specifying from which of the plurality of power line inputs the motor is to derive power.

5. The apparatus of claim 4 wherein the second mode is configured to report the status of the sampling and switching device back to a remote control system.

6. The apparatus of claim 1 wherein the first mode utilizes discrete multi-speed motor speed control.

7. The apparatus of claim 1 wherein the first mode utilizes discrete multi-level motor torque control.

8. The apparatus of claim 1 wherien the controller implements a process to track time and power levels for each of the plurality of power line inputs effective to provide an equal power draw across each of the plurality of power line inputs over a period of time.

9. The apparatus of claim 1 wherein the controller implements a randomizing function effective to drive a motor coupled with the AC-DC power supply with power from a different one of the plurality of power line inputs than at least one additional motor drive apparatus provided in the same building as the apparatus.

10. The apparatus of claim 1 wherein the power factor correction is effective to mitigate the effect of replacing a three phase motor drive apparatus with a single phase motor drive apparatus.

11. A system for driving an electric motor, the system comprising:
    a power supply module;
    a sampling and switching module operatively coupled with the power supply module and including a plurality of electrical power taps; and
    a controller operatively coupled with the sampling and switching module, the controller being configurable to operate the system in a multi-tap mode in which the sampling and switching module provides information indicating an electrical condition of the plurality of electrical power taps and controls the output of the power supply module based upon said information and a multi-phase mode in which the sampling and switching module is operated to adjust a power factor of the system and to select which of the electrical power taps is utilized to power the power supply module.

12. The system of claim 11 wherein the multi-tap mode controls the output of the power supply module to operate a motor at a first speed based upon a first electrical condition of a first one of the electrical power taps and at a second speed based upon a second electrical condition of a second one of the electrical power taps.

13. The system of claim 12 wherein the multi-tap mode wherein the multi-tap mode controls the output of the power supply to operate the motor at a third speed based upon a third electrical condition of a third one of the electrical power taps.

14. The system of claim 11 wherein the power factor correction is based upon information communicated from an external controller.

15. The system of claim 14 wherein the information communicated from the external controller is selected to balance a plurality of loads including the system and other loads in a building.

16. The system of claim 11 wherein controller modulates the time-power duration that the power supply will be connected to each of the plurality of power taps.

17. The system of claim 16 wherein the controller is configured to provide an equal amount of power draw from each of the plurality of power taps over a period of time.

18. A method comprising:
providing an electric motor drive system including an AC-DC converter configured to supply power to drive an electric motor and a controller configured to selectably connect the AC-DC converter to a plurality of power line inputs; and
installing the electric motor drive system as a replacement for an existing motor drive system, the installing comprising:
connecting the plurality of power line inputs to an existing set of power wires,
configuring the electric motor drive system in one of a first configuration in which the power output to the motor is a function of which of the plurality power line inputs is supplying current to the AC-DC converter and a second configuration in which the power factor of the electric motor drive system is actively controlled.

19. The method of claim 18 wherein the existing motor drive system is a permanent split capacitor system and the electrical motor drive system is configured in the first configuration.

20. The method of claim 18 wherein the existing motor drive system is an induction motor drive system and the electrical motor drive system is configured in the second configuration.

21. The method of claim 20 wherein the existing motor drive system is a multi-phase system.

22. The method of claim 18 wherein the power factor of the electric motor drive system is controlled to balance the load among each of the plurality power line inputs.

23. The method of claim 18 wherein the electric motor drive system is configured to drive a brushless DC electrically commutated motor.

24. The method of claim 20 wherein the existing motor drive system is a single phase system.

\* \* \* \* \*